United States Patent Office 3,113,151
Patented Dec. 3, 1963

3,113,151
DIGUANIDINE DERIVATIVES
Arthur F. McKay, Beaconsfield, Quebec, and David L. Garmaise, Montreal, Quebec, Canada, assignors to Monsanto Canada Limited, La Salle, Quebec, Canada, a Canadian company
No Drawing. Filed Feb. 23, 1961, Ser. No. 90,942
Claims priority, application Great Britain Mar. 18, 1960
10 Claims. (Cl. 260—564)

This invention relates to diguanidine derivatives, more particularly to alkylenediguanidine, xylylene diguanidine, salts of the same and to bacteriostatic and fungistatic compositions in which they are active constituents.

The compounds of the present invention are useful as industrial preservatives, as active substituents of ointments and salves for topical applications in the treatment of infected skin areas and as medicinals.

The new products of this invention have the formula:

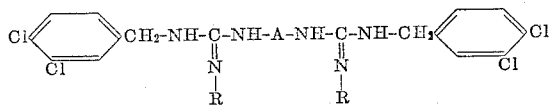

wherein the R substituent is either a hydrogen atom or a 3,4-dichlorobenzyl group and A is an alkylene group having from 2 to 12 carbon atoms or a xylylene group.

The compounds of the above formula are unexpectedly potent bacteriostats effective against both gram-positive and gram-negative organisms. For example N,N'-bis-(3,4-dichlorobenzyl)-decamethylenediguanidine dihydrochloride inhibits the growth of the following organisms at the dilutions indicated: Staph. pyogenes (penicillin sensitive) (1:2,560,000), Staph. pyogenes (penicillin resistant) (1:2,560,000), Sarcina lutea (1:20,480,000), Strept. faecalis (1:10,240,000), E. coli No. 198 (1:640,000), Aero. aerogenes (1:320,000), S. pullorum (1:1,280,000), Ps. aeruginous (1:80,000), Pr. mirabilis (1:160,000), and Pr. vulgaris (1:80,000).

Important in the utility of the new products of this invention is that not only are they unexpectedly potent bacteriostats in vitro but that they remain highly effective in the presence of serum. For example, N,N'-bis-(3,4-dichlorobenzyl)-decamethylenediguanidine dihydrochloride inhibits the growth of the following organisms in the presence of 10% serum at the dilutions indicated: Staph. pyogenes (penicillin sensitive) (1:640,000), Staph. pyogenes (penicillin resistant) (1:640,000), Sarcina lutea (1:280,000), Strept. faecalis (1:320,000), E. coli No. 198 (1:160,000), Aero. aerogenes (1:80,000), S. pullorum (1:80,000), Ps. aeruginous (1:20,000), Pr. mirabilis (1:40,000) and Pr. vulgaris (1:20,000).

Substances of the formula defined herein have also low toxicity. They were shown to have a low oral toxicity for mice of about 1.1 grams per 1 kilogram of body weight.

These compounds also possess fungicidal activity. For example, when treated against Candida albicans, Trichophytum granulosum, and Microsporum gypseum, the minimum concentrations of N,N'-bis-(3,4-dichlorobenzyl)-decamethylenediguanidine dihydrochloride to prevent growth of such fungi were 1:256,000; 1:256,000; and 1:128,000 respectively. The minimum concentration of N,N',N'',N'''-tetrakis-(3,4-dichlorobenzyl)-hexamethylenediguanidine was 1:128,000 for each of the above mentioned fungi.

Products of this invention are produced by reacting 3,4-dichlorobenzyl thiourea or 1,3-di-(3,4-dichlorobenzyl)-thiourea with an alkylating agent to form a corresponding S-alkylpseudothiuronium salt and heating said salt with an alkylenediamine or a xylylenediamine to yield the respective diguanidine salt. The free diguanidine can be extracted by known methods.

Effective alkylating agents in this process include methyl chloride and methyl iodide. When methyl iodide is used the dihydroiodide product may be converted to the corresponding dihydrochloride by extracting the free diguanidine from a basic solution of the dihydroiodide then adding hydrogen chloride to the free base. Alternatively, a methanol solution of the dihydroiodide product can be passed through a column of Amberlite IRA resin which had been previously saturated with chloride ion. The dihydrochloride product is then isolated by evaporation of the effluent.

The diamine is conveniently reacted with the S-alkylpseudothiuronium salt at temperatures of from 100° C. to 130° C. for periods of 20 to 60 minutes. Longer or shorter periods may be had dependent on the use of lower or higher temperatures and reagent present. The reaction can be carried out either in the presence or the absence of a high boiling solvent, a typical solvent being amyl alcohol.

Although the products of this invention are useful per se in controlling a wide variety of noxious life, it is preferable that they be supplied to the noxious life or to the environment of the noxious life in a dispersed form in a suitable extending agent.

In the instant specification and appended claims it is to be understood that the term "dispersed" is used in its widest possible sense. When it is said that the reaction products of this invention are dispersed it means that the particles of the reaction products of this invention may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting emulsifying agents. The term "dispersed" also means that the particles may be mixed with and distributed throughout a solid carrier providing a mixture in particulate form, e.g. pellets, tablets, granules, powders, or dusts.

In the instant specification and appended claims it is to be understood that the expression "extending agent" includes any and all of those substances in which the reaction products of this invention are dispersed. It includes, therefore, the solvents of a true solution, the liquid phase of suspensions or emulsions, the semi-solid carrier of ointments and the solid phase of particulate solids, e.g. pellets, tablets, granules, dusts and powders.

The exact concentration of the reaction products this invention employs in combatting or controlling noxious life can vary considerably provided the required dosage (i.e. toxic or lethal amount) thereof is supplied to the noxious life or to the environment of the noxious life. When the extending agent is a liquid or mixture of liquids (e.g. as in solutions, suspensions, emulsions, etc.) the concentration of the reaction product employed to supply the desired dosage generally will be in the range of 0.01 to 25 percent by weight. When the extending agent is a semi-solid or solid, the concentration of the reaction product employed to supply the desired dosage generally will be in the range of 0.1 to 25 percent by weight.

The bactericidal and fungicidal compositions of this invention may also be referred to as pesticidal compositions.

The invention is illustrated but not limited by the following examples in which the parts are by weight.

EXAMPLE I

*N,N'-Bis-(3,4-Dichlorobenzyl)-Ethylenediguanidine*

A solution of 3,4-dichlorobenzylthiourea (12.3 parts) and methyl iodide (14.2 parts) in ethanol (40 parts) was allowed to stand at 25° C. for 3 hours. The solution was then concentrated to a small volume and ether (30 parts) was added. N-(3,4-dichlorobenzyl)-S-methylpseudothiuronium iodide (18.9 parts, 95.5% yield) melting at 117–118° C. was produced.

The salt (7.5 parts) was heated in solution with ethylenediamine (0.6 part) and amyl alcohol (8 parts) at 130° C. for 1 hour. The reaction mixture was dissolved in boiling ethanol (60 parts) and the solution then allowed to cool. N,N'-bis-(3,4-dichlorobenzyl)-ethylenediguanidine dihydroiodide, M.P. 245–248° C., was recovered by filtration. Yield 4.0 parts (56%). The melting point was raised to 248–249° C. by recrystallization from ethanol.

*Analysis.*—Percent calculated for $C_{18}H_{22}Cl_4I_2N_6$: C, 30.10; H, 3.09; total halogen, 55.10; N, 11.70. Found: C, 30.16; H, 3.21; total halogen, 54.95; N, 11.53.

To convert this product to a dihydrochloride, the salt (3.42 parts) in methanol (100 parts) was passed through a column of Amberlite IRA–400 resin (25 parts) in the chloride form. The column was washed with methanol (100 parts) and the eluate was evaporated to give N,N'-bis-(3,4-dichlorobenzyl)-ethylenediguanidine dihydrochloride, M.P. 205–206° C. Yield 2.56 parts (100%).

*Analysis.*—Percent calculated for $C_{18}H_{22}Cl_6N_6$: C, 40.40; H, 4.14; Cl, 39.75; N, 15.71. Found: C, 40.53; H, 4.34; Cl, 39.37; N, 15.59.

EXAMPLE II

*N,N'-Bis-(3,4-Dichlorobenzyl)-Ethylenediguanidine*

A solution of 3,4-dichlorobenzylthiourea (23.5 parts) and methyl chloride (15.2 parts) in methanol (200 parts) was heated in an autoclave with stirring for 5 hours at 60° C. The solution was evaporated to dryness. A crystalline solid, N-(3,4-dichlorobenzyl)-S-methylpseudothiuronium chloride was produced.

The salt was heated with ethylenediamine by the procedure outlined in Example I to yield N,N'-bis-(3,4-dichlorobenzyl)-ethylenediguanidine dihydrochloride, M.P. 205–206° C. There was no depression of the melting point on admixture with the product prepared as described in Example I.

EXAMPLE III

*N,N',N'',N'''-Tetrakis-(3,4-Dichlorobenzyl)-Ethylenediguanidine*

A solution of 1,3-di-(3,4-dichlorobenzyl)-thiourea (129 parts) and methyl iodide (79 parts) in ethanol (160 parts) was refluxed for 1 hour. The solution was evaporated, and the residue crystallized from ether (150 parts). N,N'-di-(3,4-dichlorobenzyl)-S-methylpseudothiuronium iodide, (181 parts, 100% yield) melting at 150–153° C. was produced.

The salt (10.1 parts) was heated in solution with ethylenediamine (0.6 part) and amyl alcohol (10 parts) at 130° C. for 1 hour. The reaction mixture was cooled and titurated with ethanol (30 parts) and then filtered to recover the N,N',N'',N'''-tetrakis-(3,4-dichlorobenzyl)-ethylenediguanidine dihydroiodide (M.P. 225–230° C.) Yield 5.86 parts (56.5%). The melting point was raised to 276–277° C. by recrystallization from dimethylformamide-ethanol.

*Analysis.*—Percent calculated for $C_{32}H_{30}Cl_8I_2N_6$: C, 37.10; H, 2.92; total halogen, 51.88; N, 8.11. Found: C, 37.32; H, 3.04; total halogen, 51.20; N, 8.23.

To obtain the product as a free base, the salt (5.31 parts) in dimethylformamide (10 parts) was added to a solution of sodium hydroxide (0.8 part) in water (8 parts). The solution was extracted with chloroform (3×50 parts), and the chloroform solution dried and evaporated to give N,N',N'',N'''-tetrakis-(3,4-dichlorobenzyl)-ethylenediguanidine.

This free base was converted to the dihydrochloride form by dissolving it in ethanol (100 ml.) and acidifying the solution with concentrated hydrochloric acid. The crystalline dihydrochloride product was recovered by filtration, M.P. 253–254° C. Yield 2.14 parts (46.5%).

*Analysis.*—Percent calculated for $$C_{32}H_{30}Cl_{10}N_6 \cdot O_2H_3OH:$$

C, 45.41; H, 4.04; N, 9.35. Found: C, 45.86; H, 4.51; N, 9.35.

EXAMPLE IV

*N,N'-Bis-(3,4-Dichlorobenzyl)-Tetramethylenediguanidine*

N-(3,4 - dichlorobenzyl) - S - methylpseudothiuronium iodide was condensed with tetramethylenediamine by the method described in Example I, to give N,N'-bis-(3,4-dichlorobenzyl)-tetramethylenediguanidine dihydroiodide, M.P. 172–175° C. Yield 98.5%.

The dihydroiodide product was passed through a column of Amberlite IRA–400 resin in the chloride form in the manner described in Example I to give N,N'-bis-(3,4-dichlorobenzyl) - tetramethylenediguanidine dihydrochloride, M.P. 199–200° C. Yield 92.5%. Recrystallization from ethanol-ether raised the melting point to 200–201° C.

*Analysis.*—Percent calculated for $C_{20}H_{26}Cl_6N_6$: C, 42.65; H, 4.65; N, 14.92. Found: C, 42.68; H, 4.85; N, 14.43.

EXAMPLE V

*N,N',N'',N'''-Tetrakis-(3,4-Dichlorobenzyl)-Tetramethylenediguanidine*

N,N'-di-(3,4-dichlorobenzyl) - S - methylpseudothiuronium iodide (10.1 parts) was heated with tetramethylenediamine (0.88 part) at 105° C. for 20 minutes. The reaction mixture was crystallized from ethanol (40 parts) to give N,N',N'',N'''-tetrakis - 3,4 - dichlorobenzyl)-tetramethylenediguanidine dihydroiodide, M.P. 115–117° C. Yield 6.87 parts (65%).

The dihydroiodide product was passed through a column of Amberlite IRA–400 resin in the chloride form by the method described in Example I, to give N,N',N'',N'''-tetrakis - (3,4-dichlorobenzyl) - tetramethylenediguanidine dihydrochloride, M.P. 145–147° C. Yield 60.5%.

*Analysis.*—Percent calculated for $C_{34}H_{34}Cl_{10}N_6$: C, 46.34; H, 3.89; Cl, 40.24; N, 9.54. Found: C, 46.08; H, 4.10; Cl, 40.14; N, 9.48.

EXAMPLE VI

*N,N'-Bis-(3,4-Dichlorobenzyl)-Hexamethylenediguanidine*

N-(3,4 - dichlorobenzyl) - S - methylpseudothiuronium iodide was condensed with hexamethylenediamine by the method described in Example I, to give N,N'-bis-(3,4-dichlorobenzyl)-hexamethylenediguanidine dihydroiodide, a solvated crystalline substance, M.P. 137–145° C. Yield 98%.

The dihydroiodide product was passed through a column of Amberlite IRA–400 resin in the chloride form by the method described in Example I, to give N,N'-bis-(3,4-dichlorobenzyl) - hexamethylenediguanidine dihydrochloride, a solvated substance, M.P. 115° C., in quantitative yield.

This product (0.10 part) was treated with picric acid in dilute ethanol, to yield a dipicrate, M.P. 140–150° C. Yield 0.13 part (81.0%). Recrystallization from dilute acetone raised the melting point to 168–168.5° C.

*Analysis.*—Percent calculated for $C_{34}H_{34}Cl_4N_{12}O_{14}$: C, 41.81; H, 3.51; Cl, 14.53; N, 17.22. Found: C, 48.01; H, 3.53; Cl, 14.68; N, 16.98.

EXAMPLE VII

N,N'-Bis-(3,4-Dichlorobenzyl)-Decamethylenediguanidine

N-(3,4 - dichlorobenzyl) - S - methylpseudothiuronium iodide was condensed with decamethylenediamine by the method described in Example I, to give an amorphous product, N,N'-bis - (3,4-dichlorobenzyl) - decamethylenediguanidine in quantitative yield.

The dihydroiodide product was passed through a column of Amberlite IRA–400 resin in the chloride form by the method described in Example I, to give N,N'-bis-(3,4-dichlorobenzyl) - decamethylenediguanidine dihydrochloride as an amorphous solid. It gave a single spot on a paper chromatogram.

EXAMPLE VIII

N,N'-Bis-(3,4-Dichlorobenzyl)-Undecamethylenediguanidine

N-(3,4 - dichlorobenzyl) - S - methylpseudothiuronium iodide was condensed with undecamethylenediamine as described in Example I to give an amorphous product. The dihydroiodide was passed through a column of Amberlite IRA–400 resin in the chloride form to give N,N'-bis-(3,4-dichlorobenzyl) - undecamethylenediguanidine dihydrochloride as an amorphous solid which gave a single spot on a paper chromatogram.

EXAMPLE IX

N,N'-Bis-(3,4-Dichlorobenzyl)-Dodecamethylenediguanidine

N-(3,4 - dichlorobenzyl) - S - methylpseudothiuronium iodide was condensed with dodecamethylenediamine as described in Example I to give an amorphous product. The dihydroiodide was passed through a column of Amberlite IRA–400 resin in the chloride form to give N,N'-bis-(3,4-dichlorobenzyl) - dodecamethylenediguanidine dihydrochloride as an amorphous solid which gave a single spot on a paper chromatogram.

EXAMPLE X

N,N'-Bis-(3,4-Dichlorobenzyl)-m-Xylylenediguanidine

N-(3,4 - dichlorobenzyl) - S - methylpseudothiuronium iodide was condensed with x-xylylenediamine as described in Example I to give the product as the dihydroiodide, which was isolated as a solvated crystalline solid. The dihydroiodide was passed through a column of Amberlite IRA–400 resin in the chloride form to give N,N'-bis - (3,4-dichlorobenzyl) - m - xylylenediguanidine dihydrochloride as an amorphous solid which gave a single spot on a paper chromatogram.

EXAMPLE XI

N,N',N'',N'''-Tetrakis-(3,4-Dichlorobenzyl)-Hexamethylenediguanidine

N,N'-bis-(3,4-dichlorobenzyl) - S - methylpseudothiuronium iodide was condensed with hexamethylenediamine as described in Example I to give the product as the dihydroiodide, which was isolated as a solvated crystalline solid. The dihydroiodide was passed through a column of Amberlite IRA–400 resin in the chloride form to give N,N',N'',N'''-tetrakis-(3,4-dichlorobenzyl)-hexamethylenediguanidine dihydrochloride as a solvated crystalline solid melting at 125° C.

EXAMPLE XII.—TABLETS

N,N'-bis-(3,4-dichlorobenzyl) - decamethylenediguanidine dihydrochloride (1000 grams), starch (150 grams), gum acacia (2 grams), milk sugar (470 grams), talc (176 grams) and stearic acid (8 grams) are mixed thoroughly in a mechanical mixer and compressed into slugs. The material is ground and screened to give No. 14 to No. 16 mesh granules. These granules are compressed into tablets with a ¼ inch concave punch. Each tablet contains approximately 100 mg. of active ingredient.

We claim:
1. Compounds which in their free base form have the formula:

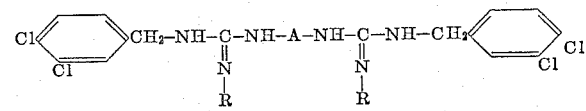

wherein R is selected from one of the group consisting of hydrogen and 3,4-dichlorobenzyl and A is selected from a group consisting of an alkylene group having from 2 to 12 carbon atoms and a xylylene group.

2. N,N' - bis - (3,4 - dichlorobenzyl) - ethylene - diguanidine.
3. N,N' - bis - (3,4 - dichlorobenzyl) - tetramethylenediguanidine.
4. N,N' - bis - (3,4 - dichlorobenzyl) - hexamethylenediguanidine.
5. N,N' - bis - (3,4 - dichlorobenzyl) - decamethylenediguanidine.
6. N,N' - bis - (3,4 - dichlorobenzyl) - undecamethylenediguanidine.
7. N,N' - bis - (3,4 - dichlorobenzyl) - dodecamethylenediguanidine.
8. N,N',N'',N''' - tetrakis - (3,4 - dichlorobenzyl)-ethylenediguanidine.
9. N,N',N'',N''' - tetrakis - (3,4 - dichlorobenzyl)-tetramethylenediguanidine.
10. N,N'N'',N''' - tetrakis - (3,4 - dichlorobenzyl)-hexamethylenediguanidine.

References Cited in the file of this patent

UNITED STATES PATENTS

| | | |
|---|---|---|
| 1,737,192 | Heyn | Nov. 26, 1929 |
| 2,684,924 | Rose et al. | July 27, 1954 |
| 2,863,919 | Birtwell et al. | Dec. 9, 1958 |

FOREIGN PATENTS

| | | |
|---|---|---|
| 481,925 | Germany | Sept. 2, 1929 |

OTHER REFERENCES

Grogan et al., J. Org. Chem., volume 18, pp. 728 to 735 (1953).

Rose et al., J. Chem. Soc. (London, volume of 1956, pp. 4422 to 4425.